(12) United States Patent
Jiang et al.

(10) Patent No.: US 12,204,670 B2
(45) Date of Patent: Jan. 21, 2025

(54) USING SMART CONTRACTS TO MANAGE HYPER PROTECT DATABASE AS A SERVICE

(71) Applicant: International Business Machines Corporation, Armonk, NY (US)

(72) Inventors: Peng Hui Jiang, Beijing (CN); Timo Kussmaul, Boeblingen (DE); Stefan Schmitt, Holzgerlingen (DE); Xiang Dong Hu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 352 days.

(21) Appl. No.: 17/656,673

(22) Filed: Mar. 28, 2022

(65) Prior Publication Data

US 2023/0315880 A1     Oct. 5, 2023

(51) Int. Cl.
    *G06F 21/62*     (2013.01)
(52) U.S. Cl.
    CPC ................ *G06F 21/6218* (2013.01)
(58) Field of Classification Search
    CPC ....... G06F 21/6218; G06F 21/53; G06F 21/64
    See application file for complete search history.

(56) References Cited

U.S. PATENT DOCUMENTS

| 7,353,180 | B1  |      | 4/2008  | Silverstone |            |
|-----------|-----|------|---------|-------------|------------|
| 10,715,339| B1  | *    | 7/2020  | Wei ......................| H04L 9/0894 |
| 11,042,400| B1  |      | 6/2021  | Holsman     |            |
| 11,049,099| B2  | *    | 6/2021  | Yan ......................... | G06F 21/64 |
| 11,418,511| B2  | *    | 8/2022  | Fang ................... | H04L 63/0407 |
| 11,640,546| B2  | *    | 5/2023  | Corning .............. | H04L 41/0806 706/46 |
| 2019/0050855 | A1 | * | 2/2019 | Martino ................ | G06F 16/182 |
| 2019/0058696 | A1 | * | 2/2019 | Bowman ............. | G06F 21/6218 |
| 2019/0158275 | A1 |   | 5/2019 | Beck |      |
| 2019/0370358 | A1 | * | 12/2019 | Nation .................. | H04L 9/0643 |
| 2020/0034353 | A1 |   | 1/2020 | Innocenti |  |
| 2020/0151708 | A1 | * | 5/2020 | Sui ........................ | H04L 9/0637 |
| 2020/0167503 | A1 | * | 5/2020 | Wei ....................... | G06F 21/602 |
| 2020/0322129 | A1 | * | 10/2020 | Wei ...................... | H04L 9/0643 |

(Continued)

FOREIGN PATENT DOCUMENTS

| CN | 106775619 A | 5/2017 |
| CN | 108681943 A | 10/2018 |

(Continued)

OTHER PUBLICATIONS

Chinese Patent CN 112035090 A with English language translation (Year: 2020).*

(Continued)

*Primary Examiner* — Joseph P Hirl
*Assistant Examiner* — Thomas A Gyorfi
(74) *Attorney, Agent, or Firm* — Michael O'Keefe; Stephen R. Yoder

(57) ABSTRACT

Building and using a smart contract in order to resolve the isolation between database users and service operators for hyper-protect database as a service (DBaaS). The use of the smart contract in the hyper-protect DBaaS environment allows the service operator to perform operations on sensitive and secure data in the database owned by a user without necessarily revealing the content of the sensitive and secure data.

18 Claims, 11 Drawing Sheets

(56) References Cited

U.S. PATENT DOCUMENTS

| | | | |
|---|---|---|---|
| 2021/0004794 A1 | 1/2021 | Kumar Kumaresan | |
| 2021/0126777 A1* | 4/2021 | Mash | H04L 43/10 |
| 2021/0232662 A1* | 7/2021 | Corning | H04L 67/34 |

FOREIGN PATENT DOCUMENTS

| | | | |
|---|---|---|---|
| CN | 112035090 A | | 12/2020 |
| WO | 2017153495 A1 | | 9/2017 |
| WO | WO-2020058993 A1 | * | 3/2020 |

OTHER PUBLICATIONS

"Patent Cooperation Treaty PCT International Search Report", Applicant's File Reference: EIE230086PCT, International Application No. PCT/CN2023/074955, International Filing Date: Feb. 8, 2023, Date of Mailing: May 17, 2023, 7 pages.

Mell et al., "The NIST Definition of Cloud Computing", NIST National Institute of Standards and Technology U.S. Department of Commerce, Special Publication 800-145, Sep. 2011, 7 pages.

Vizitei, Yuri, "Lacero Combines Policy Enforcement with Blockchain to Deliver Unprecedented Security", IBM Cloud Blog, Blockchain, Aug. 2, 2021, 7 pages, <https://www.IBM.com/cloud/blog/lacero-combines-policy-enforcement-with-blockchain-to-deliver-unprecedented-security>.

* cited by examiner

USING SMART CONTRACTS TO MANAGE HYPER PROTECT DATABASE AS A SERVICE

BACKGROUND

The present invention relates generally to the field of cloud computing technology, and more specifically to providing a variety of database services for enterprises that use and/or rely upon cloud computing resources.

Hyper Protect Database as a Service (DBaaS) refers to an enterprise cloud database environment with a high availability for sensitive data workloads. The Hyper Protect DBaaS also serves to protect against data breach threats and data manipulation by privileged users (that is, users who otherwise have authorized access to sensitive and confidential information relating to and/or used by an entity for which this user is responsible for). (Note: the term(s) "HYPER PROTECT" and/or "HYPER PROTECT DBaaS" may be subject to trademark rights in various jurisdictions throughout the world and are used here only in reference to the products or services properly denominated by the marks to the extent that such trademark rights may exist.)

The Wikipedia Entry for "Smart contract" (as of Feb. 1, 2022) states as follows: "A smart contract is a computer program or a transaction protocol which is intended to automatically execute, control or document legally relevant events and actions according to the terms of a contract or an agreement. The objectives of smart contracts are the reduction of need in trusted intermediators, arbitrations and enforcement costs, fraud losses, as well as the reduction of malicious and accidental exceptions . . . . Smart contracts should be distinguished from smart legal contracts. The latter refers to a traditional natural language legally-binding agreement which has certain terms expressed and implemented in machine-readable code."

SUMMARY

According to an aspect of the present invention, there is a method, computer program product and/or computer system that performs the following operations (not necessarily in the following order): (i) receive a first database usage condition, with the first database usage condition including information indicating that a first program is running in an encrypted database; (ii) determining, by a user of the first program, that a first parameter needs to be modified in the first program that is running in the encrypted database; (iii) creating, by the user of the first program and a service operator of the encrypted database, a smart contract, with the smart contract being configured to automatically resolve program modification requests by the user of the first program to the service operator of the encrypted database; (iv) requesting, by the user, that the first parameter needs to be modified in the first program that is running in the encrypted database; and (v) modifying, by the service operator of the encrypted database, the first parameter in the first program that is running in the encrypted database.

According to an aspect of the present invention, there is a method, computer program product and/or computer system that performs the following operations (not necessarily in the following order): (i) providing a hyper-protect secure container, with the hyper-protect secure container including a plurality of access layers, with at least a first access layer being accessible by a database user and a second access layer being accessible by a service operator; (ii) identifying a group of managed objects within the hyper-protect secure container that can be managed by a smart contract; (iii) creating the smart contract, with the smart contract including information indicative of a set of user specified instructions for managing the group of managed objects within the hyper-protect secure container; (iv) receiving an agreement between the database user and the service operator to deploy the smart contract to manage the hyper-protect secure container; and (v) performing, by the smart contract, the set of user specified instructions for the group of managed objects within the hyper-protect secure container.

DETAILED DESCRIPTION

Figure 1:
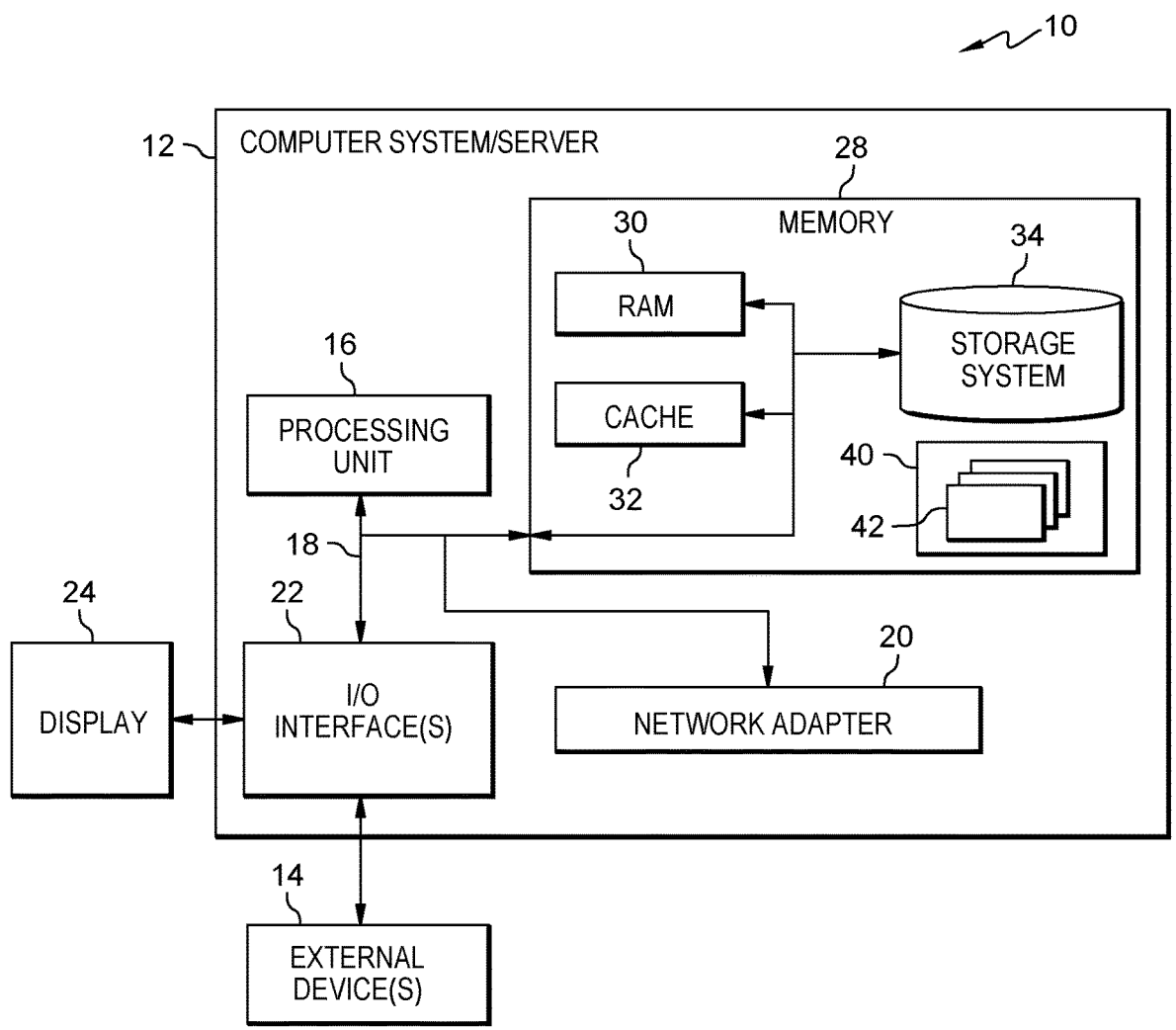
FIG. 1 depicts a cloud computing node used in a first embodiment of a system according to the present invention.

Some embodiments of the present invention are directed to building and using a smart contract in order to resolve the isolation between database users and service operators for hyper-protect database as a service (DBaaS). The use of the smart contract in the hyper-protect DBaaS environment allows the service operator to perform operations on sensitive and secure data in the database owned by a user without necessarily revealing the content of the sensitive and secure data.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
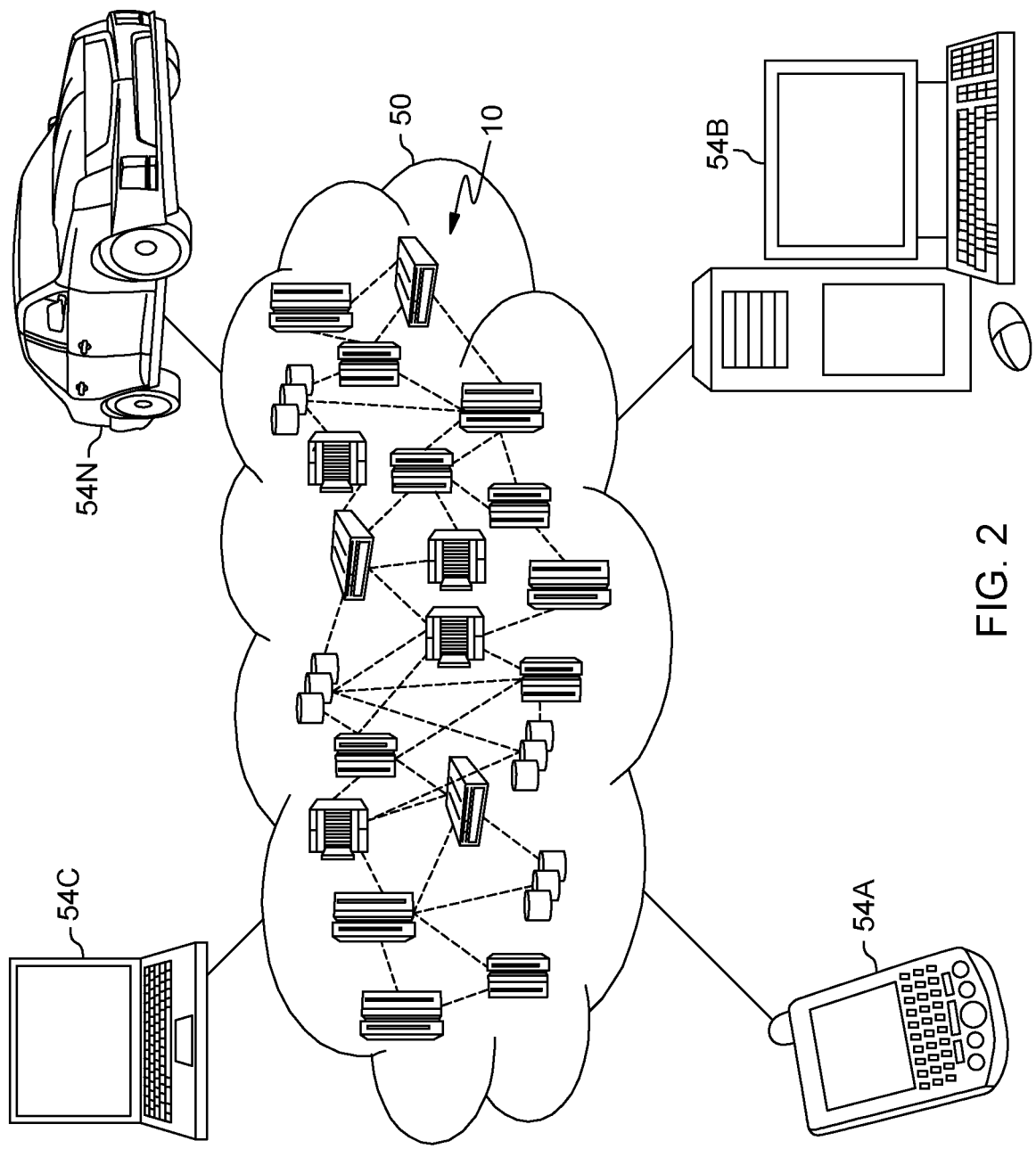
FIG. 2 depicts an embodiment of a cloud computing environment (also called the "first embodiment system") according to the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
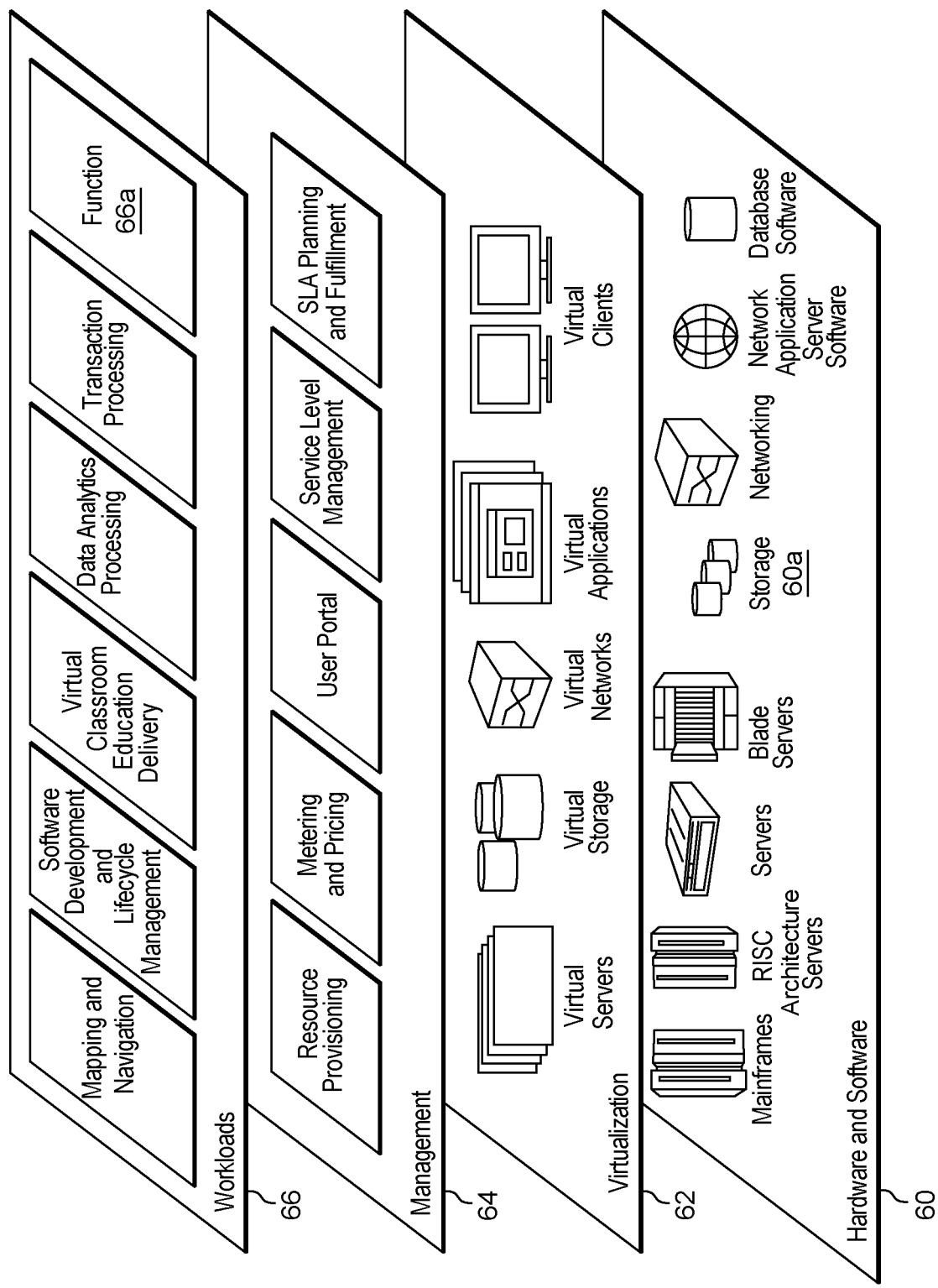
FIG. 3 depicts abstraction model layers used in the first embodiment system.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes; RISC (Reduced Instruction Set Computer) architecture based servers; storage devices; networks and networking components. In some embodiments software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and functionality according to the present invention (see function block 66a) as will be discussed in detail, below, in the following sub-sections of this Detailed description section.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 4:
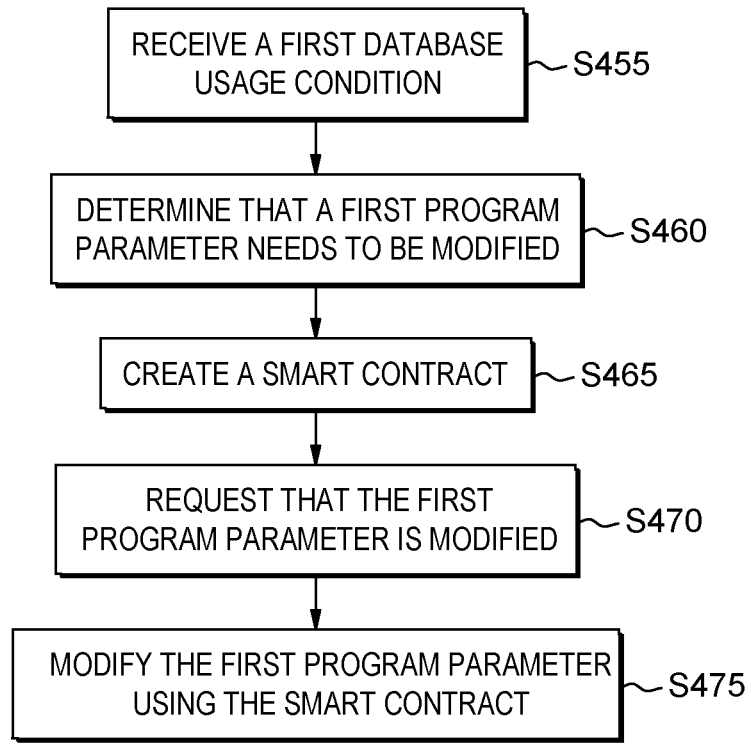
FIG. 4 is a flowchart showing a first embodiment method performed, at least in part, by the first embodiment system.
Figure 5:
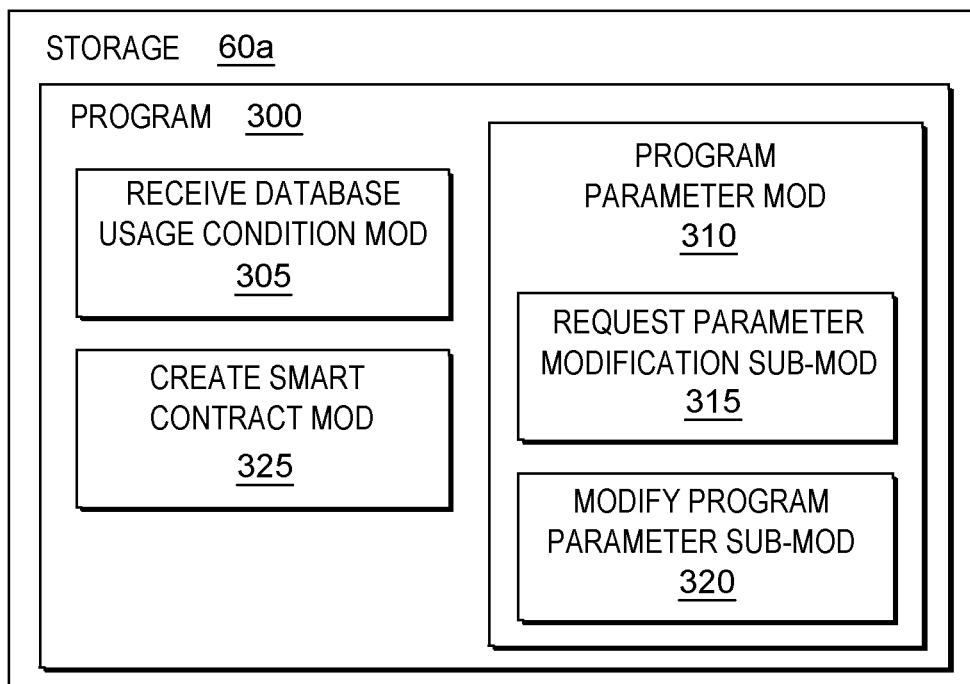
FIG. 5 is a block diagram showing a machine logic (for example, software) portion of the first embodiment system.

FIG. 4 shows flowchart 450 depicting a method according to the present invention. FIG. 5 shows program 300 for performing at least some of the method operations of flowchart 450. This method and associated software will now be discussed, over the course of the following paragraphs, with extensive reference to FIG. 4 (for the method operation blocks) and FIG. 5 (for the software blocks). One physical location where program 300 of FIG. 5 may be stored is in storage block 60a (see FIG. 3).

Processing begins at operation S455, where receive database usage condition module ("mod") 305 receives a first database usage condition. In some embodiments of the present invention, the database usage condition includes information indicating that a given program is running in an encrypted database (as part of a Database as a Service or DBaaS). Additionally, in some embodiments, receive database usage condition mod 305 can be configured by a user of the DBaaS service to determine whether a single program is currently being run, or multiple programs are currently being run. The significance of this determination is that mod 305 can be used as a way for a DBaaS user to understand how certain programs are being run in the encrypted database, which ultimately allows for the user to better configure the conditions that are present in the smart contract (discussed in greater detail in connection with operation S465, below).

Processing proceeds to operation S460, where program parameter mod 310 determines that a first program parameter of the given program running in the encrypted database needs to be modified. In some embodiments of the present invention, program parameter mod 310 makes this decision based upon the performance requirements of the DBaaS user. In some embodiments, the DBaaS user can create a list of requirements and/or conditions that need to be met while utilizing a given DBaaS service.

Processing proceeds to operation S465, where create smart contract mod 325 creates a smart contract. In some embodiments, the smart contract is a computer program or a transfer protocol that is structured and configured to automatically resolve program modification requests. In some embodiments, the program modification requests can be made automatically from program parameter mod 310 (discussed in connection with operation S460, above). Alternatively, program modification requests can come from a user of the given program, and this user is a customer of an enterprise that hosts the user's data in a manner that is consistent with the DBaaS model (defined in greater detail in Sub-Section III, below).

Processing proceeds to operation S470, where request parameter modification sub-module ("sub-mod") 315 of program parameter mod 310 requests that the first program parameter of the given program should be modified. Request parameter modification sub-mod 315 makes this request based upon the requirements and/or operating conditions that the DBaaS user needs in order to properly fulfill the user's end goals (as mentioned in connection with operation S455 and S460, above).

Processing finally proceeds to operation S475, where modify program parameter sub-mod 320 modifies the first program parameter of the given program using the smart contract. In some embodiments of the present invention, the modification of the program parameters by mod 320 is an ongoing process based upon the received program modification requests that the DBaaS user creates in the smart contract (discussed above in connection with operation S465, above).

III. Further Comments and/or Embodiments

With the deeper adoption of cloud computing technology, database as a service (DBaaS) is used to allow databases to be consumed as service in the cloud. DBaaS is different from other cloud-based services because there are large amounts of sensitive and confidential data that may be stored in a local database or a cloud database. The sensitive and/or confidential nature of the stored data increases storage risks to customers due to the potential that their private data can become corrupted and/or accessed in an unauthorized manner by those who do not have privilege to access the sensitive and/or confidential data.

Hyper Protect DBaaS provides highly secured databases on demand and allows customers to retain their data in a fully encrypted database. A hyper-secure DBaaS provides significant additional protection against security breaches by delivering pervasive encryption capabilities in addition to the benefits of secure service container technology.

Hyper protect DBaaS users can utilize the provisioned database(s) and manage their data while the service operator can only manage database instances without the ability to access any user data. In this way, the goal of hyper protection is achieved; however, the separation between user and service operator causes management gaps for managed databases. Some embodiments of the present invention recognize that it may be necessary to have a smart contract to allow certain connections for the service operator to manage the database(s).

Embodiments of the present invention are structured and configured to build and use smart contracts to resolve the isolation between database users and service operators for hyper protect DBaaS. This includes: (i) identify an access layer for database users and an access layer for service operators; (ii) identify the managed data object or object group that can be managed using a smart contract; (iii) initiate the creation of the smart contract from database users or from service operators with a specified template, including backup & restore, or monitoring and alerting, or a customized template; and (iv) get an agreement between database users and service operators and deploy the smart contract to the database as a service (DBaaS).

Some embodiments of the present invention are directed to creating a smart contract using a database (DB) agent against a managed data object or an object group. Creating the smart contract may include the following operations: (i) validate the condition to execute smart contract; (ii) validate the input to execute smart contract; (iii) execute the smart contract against the limited-resource object; (iv) validate the output for smart contract execution; (v) generate a filtered output for database users or service operators; and (vi) adjust the smart contract according to the validated conditions and the validated inputs and outputs.

Some embodiments of the present invention are directed to providing one or more of the following three advantages: (i) resolve the isolation between service operator and database users; (ii) perform the operations from service operator with the agreement from database users; and (iii) improved alert to the database user and early engagement.

Figure 6:
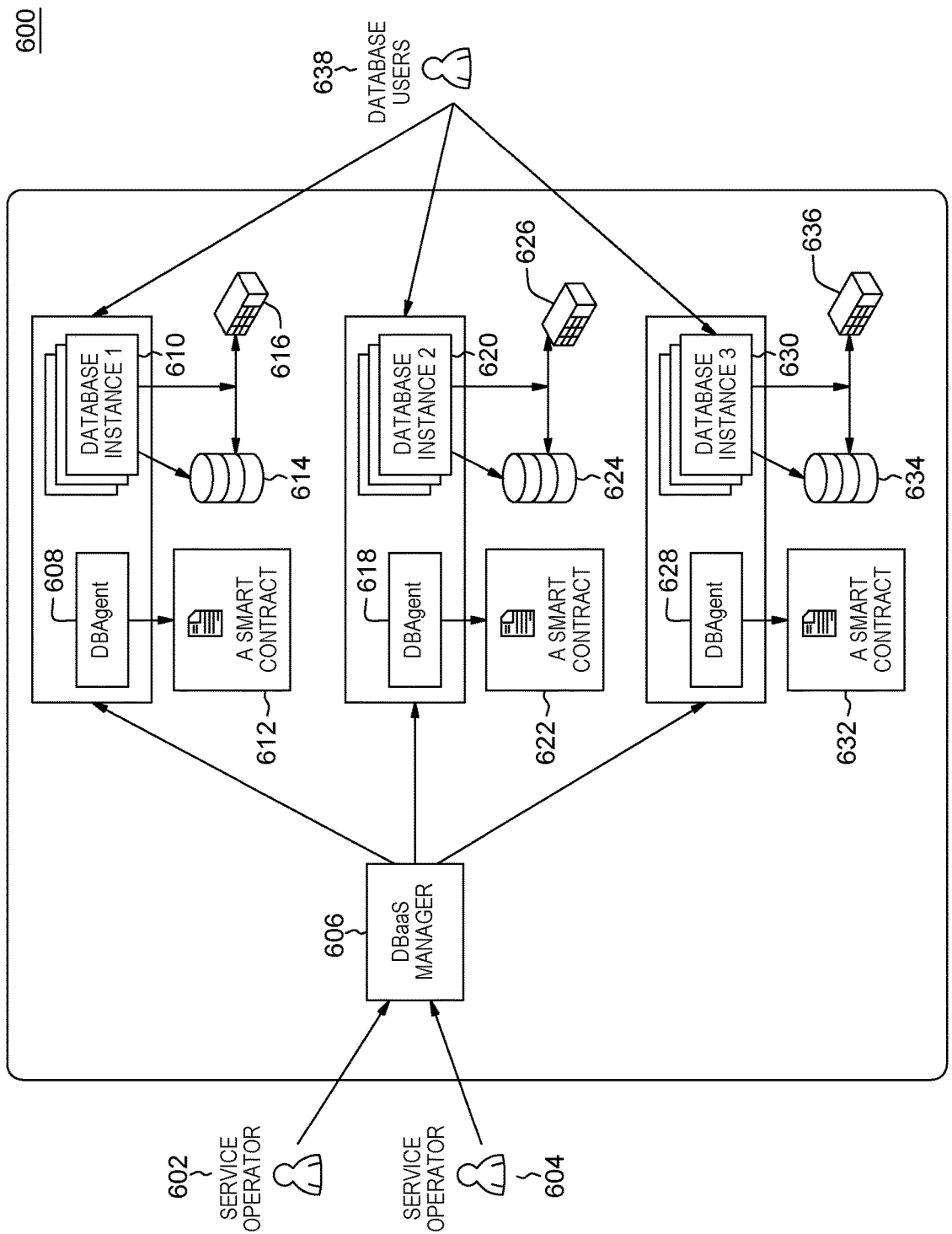
FIG. 6 is a block diagram showing a system architecture of an embodiment according to the present invention.

Block diagram 600 of FIG. 6 shows a graphical representation of a system architecture of an embodiment of the present invention. Block diagram 600 includes: service operator 602, service operator 604, DBaaS manager 606, database agent 608, database instance 610, smart contract 612, secure container 614, database 616, database agent 618, database instance 620, smart contract 622, secure container 624, database 626, database agent 628, database instance 630, smart contract 632, secure container 634, database 636, and database user(s) 638.

In some embodiments, the hyper protect aspects of the DBaaS model includes the following features, characteristics and/or advantages: (i) creates an isolation between database user scenario and service operator scenario; (ii) provides a secure service container with no access from the service side, including workload, data, etc. (in other words, no data can be accessed by an administrator or an outside non-authorized user); and (iii) metadata may change or be encrypted/decrypted according to a specified rule that may be checked prior to allowing connections between the database user and the service operator.

In some embodiments, a "smart contract" is like a cryptographic box that contains information that is valuable and confidential to a given user and can only be unlocked in the event that certain conditions are met.

Typically, the smart contract is a self-executing contract with the terms of the agreement between two contracting groups being directly written into lines of code (such as between database user(s) 638, service operator 602, and/or service operator 604). According to some embodiments of the present invention, the code and the agreements contained in the smart contract exist across a distributed, decentralized blockchain network. The code controls the execution of the terms of the smart contract and the transactions made can be tracked and are irreversible.

Figure 7:
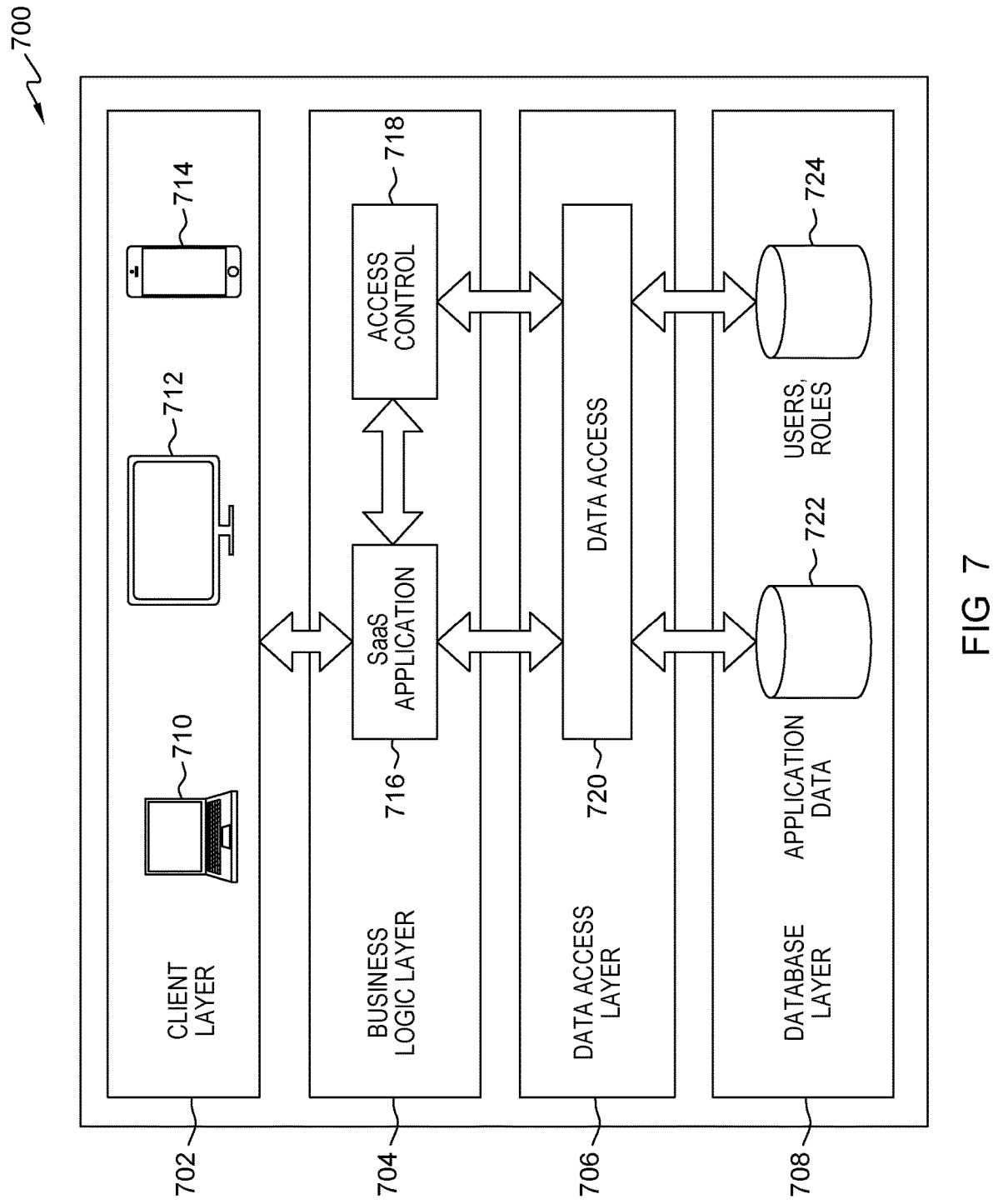
FIG. 7 is a block diagram showing an access layer architecture of an embodiment of the present invention.

Block diagram 700 of FIG. 7 shows a graphical representation of a series of access layers according to the present invention. Block diagram 700 includes: client layer 702, business logic layer 704, database access layer 706, database layer 708, user device 710, user device 712, user device 714, SaaS application 716, access control 718, data access module 720, application data 722 and user data 724.

The vertical data access layers may be used according to an existing access path, including, for example, database layer 708, database access layer 706, business logic layer 704, and client layer 702. The horizontal access layers 702, 704, 706, 708 in FIG. 7 are identified according to users and roles for database users and service operators, and their boundaries are pre-defined.

Managing object identification according to some embodiments of the present invention depends on the managed database, the managed objects, or ensuring that the object groups are different. For example, with relational databases, the objects (or object groups) include: databases, tables, views, rows, records, transaction logs, security, and replication status. With respect to NoSQL, the object (or object groups) include: databases, documents, full text index(es), materialized views, and/or objects for logging and monitoring operations.

Figure 8:
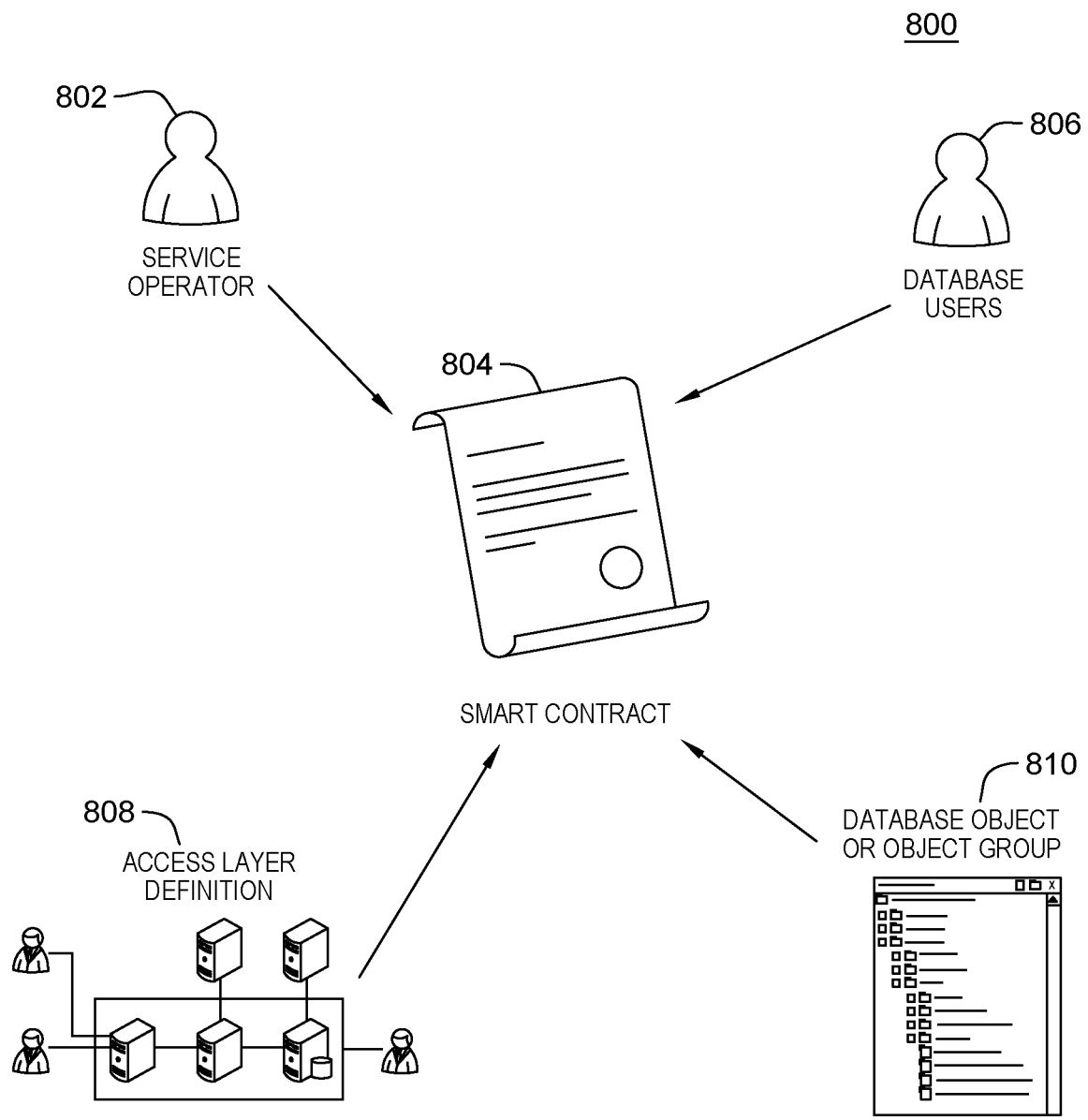
FIG. 8 is a block diagram showing information that is helpful in understanding embodiments of the present invention.

In some embodiments of the present invention, smart contracts are initialized and deployed. Block diagram 800 of FIG. 8 shows a graphical representation of components in a smart contract deployment. Block diagram 800 includes: service operator 802, smart contract 804, database user(s) 806, access layer definition 808, and database object or object group 810.

In some embodiments of the present invention, the smart contract is initialized by using pre-defined templates or created on-demand by binding multiple dimensions of a smart contract. Binding multiple dimensions includes using the components of a smart contract deployment described in connection with block diagram 800, above. According to some embodiments of the present invention, the smart contract is deployed to the DBaaS by updating the database agent with a version control.

Figure 9:
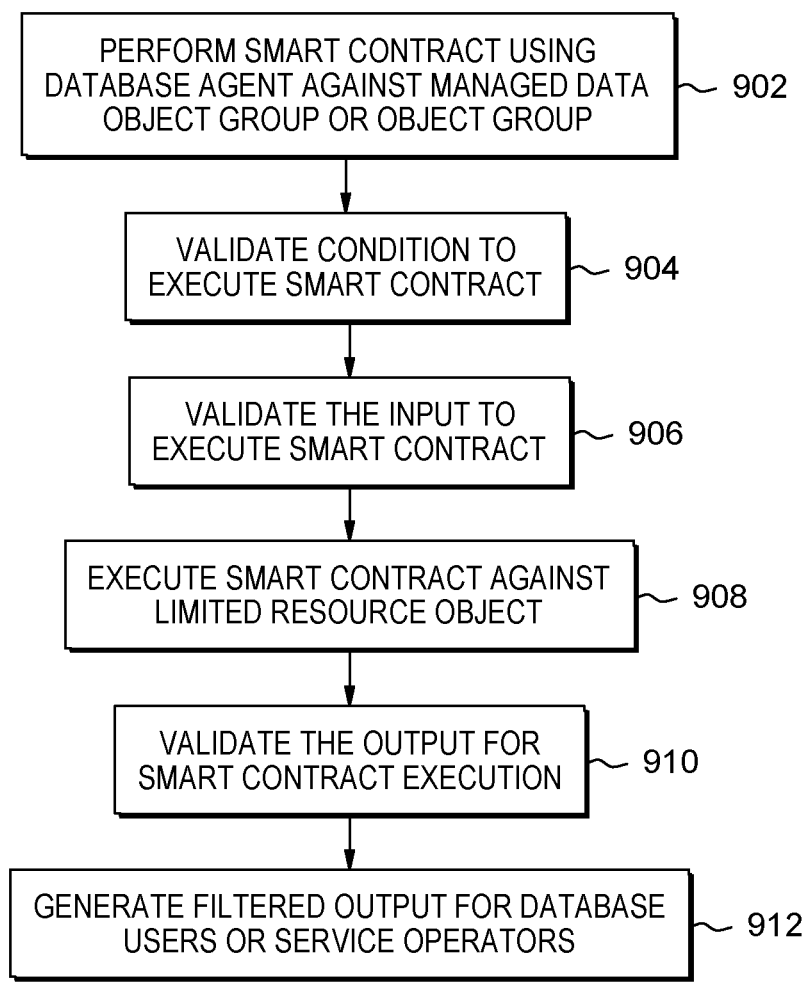
FIG. 9 is a flowchart showing a second embodiment method performed, at least in part, by the first embodiment system.

When the smart contract is initialized and deployed, the smart contract is executed. Flowchart 900 of FIG. 9 shows the operations that included in this process. The smart contract execution process includes the following operations (not necessarily in the stated order): (i) the smart contract is executed by using a database agent, such as database agent 608, database agent 618, and/or database agent 628 (FIG. 6) against the managed data object or object group (operation 902); (ii) the condition that is required to execute the smart contract is validated (operation 904); (iii) the input needed to execute the smart contract is validated (operation 906); (iv) the smart contract is executed against a limited resource object (operation 908); (v) the output needed to execute the smart contract is validated (operation 910); and (vi) the filtered output for database users, such as database user(s) 806 (FIG. 8), or service operators, such as service operator 802, is generated (operation 912).

In some embodiments of the present invention, service operators may be required to access a backup and its log from a database system. In this type of instance, the service operators may use a "BackupRestoreMachine" function by giving a token to be recorded on the blockchain. The service operator receives a receipt that is held in the virtual contract. In some embodiments of the present invention, a database user can give the service operator the digital entry key that is set to arrive by a specified time. If the key does not arrive by the specified time, the blockchain releases a refund. If the customer, such as the database user, sends the key to the service operator before the specified time, the function holds it by releasing both the fee and the key to the service operator.

Figure 10:
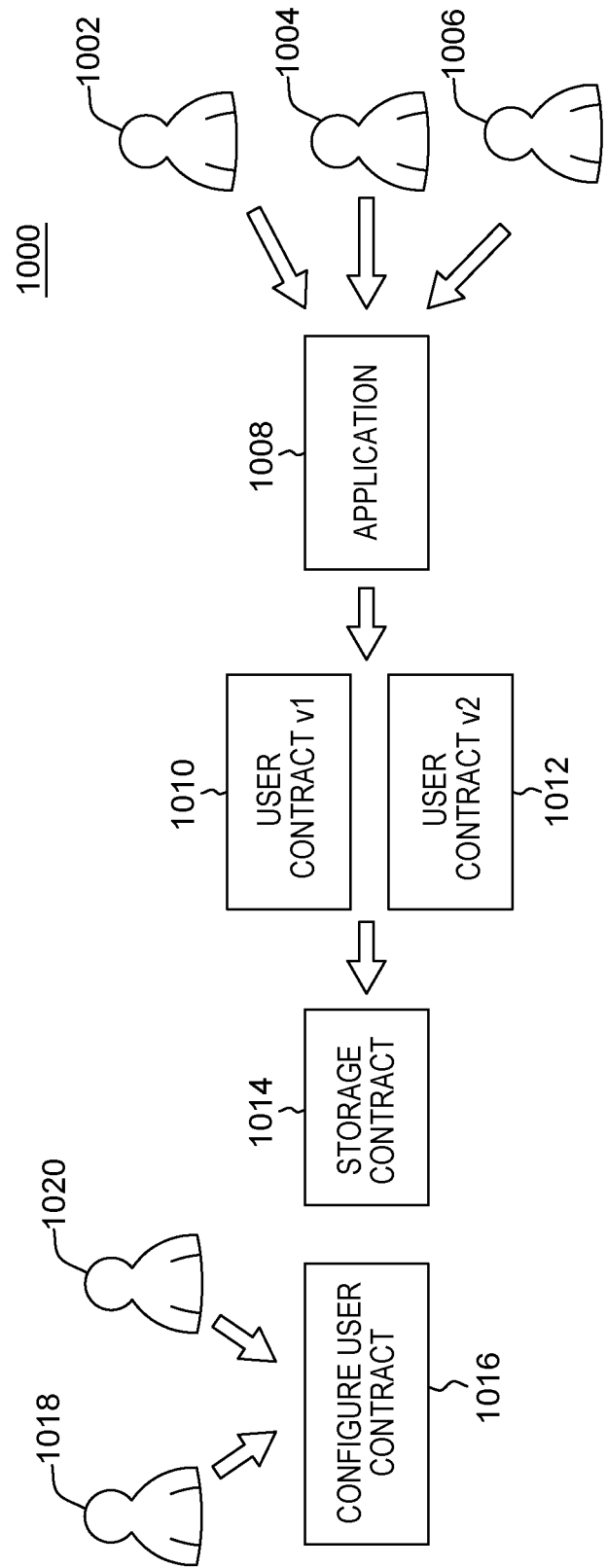
FIG. 10 is a flow diagram showing information that is helpful in understanding embodiments of the present invention.

In some embodiments of the present invention, the smart contract is refreshed as shown in flow diagram 1000 of FIG. 10. Database users, such as database user 1002, database user 1004, and/or database user 1006 interact with application 1008 to modify and/or utilize the user contract, which is a smart contract.

In some embodiments of the present invention, either the service operator or the database user can configure user contract 1016, such as service operator 1018 or database user 1020. In this example, service operator 1018 decides to configure user contract 1010, which is a first version of a user contract, with particular instructions and to store user contract 1010 in storage contract 1014, which is a smart contract data storage medium. At a future point in time or simultaneous to the configuration of user contract 1010, database user 1020 may alter the business logic so that user contract 1012 can be used, which is a second version of the user contract. Upon altering the business logic, user contract 1012 may be written to storage contract 1014. According to some embodiments of the present invention, a new version of a user contract (not shown) receives an endorsement from a secondary database user and the new version of the user contract is enabled and deployed to the system.

Figure 11:
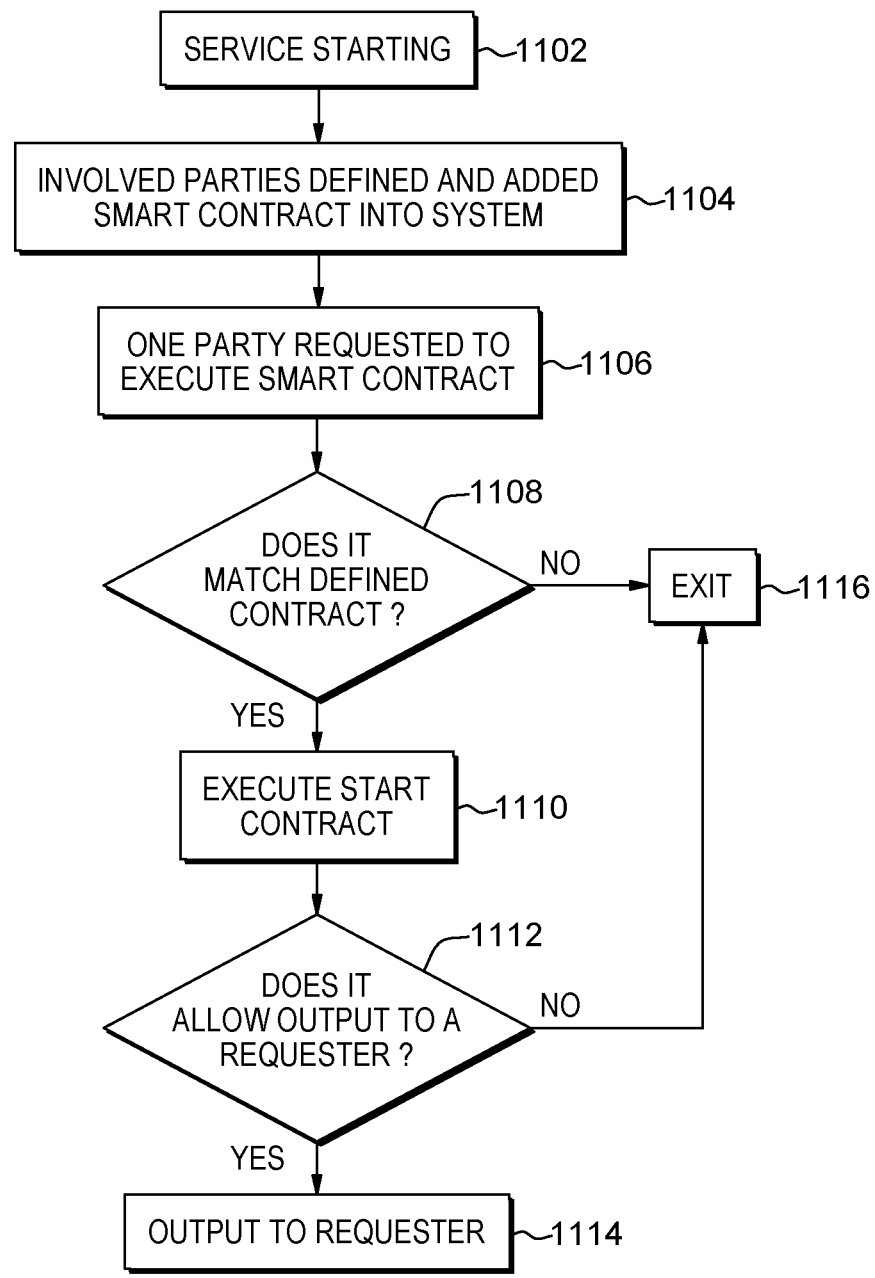
FIG. 11 is a flowchart showing a third embodiment method performed, at least in part, by the first embodiment system.

Some embodiments of the present invention are directed to the method for executing the smart contract shown in flowchart 1100 of FIG. 11. Flowchart 1100 shows the method including the following operations (not necessarily in the stated order): (i) start service (operation 1102); (ii) define and add involved parties, such as the service operator and the database user, to the smart contract, which may be deployed into the system (operation 1104); (iii) either the service operator or the database user submits a request to execute the smart contract (operation 1106); (iv) determine whether the deployed smart contract matches the defined contract (operation 1108); (v) execute the smart contract if the deployed smart contract matches the defined contract (operation 1110); (vi) terminate the process if the deployed smart contract does not match the defined contract (operation 1116); (viii) responsive to the execution of the smart contract, determine whether the terms of the smart contract allow output to the requester (operation 1112); (ix) output the smart contract to the requester if allowed (operation 1114); and (x) terminate the process if the smart contract does not allow output to the requester (operation 1116).

Some embodiments of the present invention may include one, or more, of the following features, characteristics and/or advantages: (i) resolves the isolation between service operators and database users; (ii) performs the operations of the service operator with the agreement from database users; and (iii) provides better alerts to database users and encourages early engagement in the context of the hyper protect DBaaS model.

Figure 12:
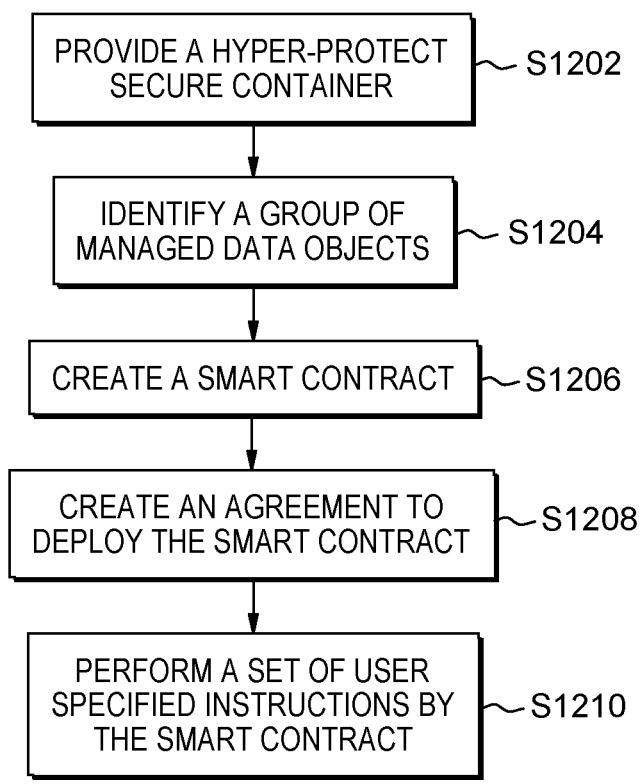
FIG. 12 is a flowchart showing a fourth embodiment method performed, at least in part, by the first embodiment system.

Flowchart 1200 of FIG. 12 is a method for creating and using a smart contract(s) in the context of a hyper-protect secure container, which is part of the hyper protect DBaaS model, the method is described below with reference also to FIG. 6 for system/architecture components.

Processing begins at operation S1202, where a hyper-protect secure container such as secure container 614, secure container 624, and/or secure container 634 is provided. In some embodiments of the present invention, the hyper-protect secure container includes a plurality of access layers, with each access layer being structured and configured to store and/or manage sensitive and secure data. Additionally, in some embodiments of the present invention, at least a first group of access layers are accessible by a database user(s), and at least a second group of access layers are accessible by a service operator(s).

Processing proceeds to operation S1204, where a group of managed objects are identified. In this example, a data object, or an object group is stored and managed in various access layers of the hyper-protect secure container. The data object may include various functions and/or methods that a database user needs in order to properly run software applications and/or processes that are provisioned on the hyper-protect secure container.

Processing proceeds to operation S1206, where a smart contract is created. In this example, the database user or the service operator initiates the creation of a smart contract, such as smart contract 804 (FIG. 8) using a specified template or a customized template. The template allows a smart contract to include specific instructions for various functions, including: performing backup and restore functions on the data that is stored in the hyper-protect secure container and/or monitoring and alerting the database user with respect to any meaningful changes to the data. In some embodiments of the present invention, the database user can create specific instructions and/or a set of conditions, or rules, that will determine the meaningfulness of changes made to the data;

Processing proceeds to operation S1208, where the database user, such as database user 806 (FIG. 8) and the service operator, such as service operator 802 (FIG. 8) create an agreement to deploy the smart contract in order to manage the data object, object group, in the hyper-protect secure container.

Processing ends at operation S1210, where the smart contract executes to perform the set of user-specified instructions for the data object, or object group that is stored and managed in the hyper-protect secure container. In some embodiments of the present invention, the smart contract is used for: (i) validating a condition used to execute the smart contract; (ii) validating an input (or inputs) to execute the smart contract; (iii) validating an output (or outputs) to execute the smart contract; (iv) executing the smart contract against a limited-resource object; (v) generating a filtered output for the database user and/or the service operator; (vi) adjusting the terms of the smart contract according to a set of user-specified operating conditions; and/or (vii) adjusting the terms of the smart contract according to the validated input(s) and/or output(s).

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above-similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) comprising:
providing a hyper-protect secure container, with the hyper-protect secure container including a plurality of access layers, with at least a first access layer being accessible by a database user and a second access layer being accessible by a service operator;
identifying a group of managed objects within the hyper-protect secure container that can be managed by a smart contract;
creating the smart contract, with the smart contract including information indicative of a set of user specified instructions for managing the group of managed objects within the hyper-protect secure container, wherein the smart contract includes additional instructions for various functions comprising performing a backup and restore function on data stored in the hyper-protect secure container and monitoring and alerting the database user with respect to meaningful changes to the data;
receiving an agreement between the database user and the service operator to deploy the smart contract to manage the hyper-protect secure container; and
performing, by the smart contract, the set of user specified instructions for the group of managed objects within the hyper-protect secure container.

2. The CIM of claim 1 wherein a first instruction of the set of user specified instructions for the group of managed objects is validating a first condition to execute the smart contract.

3. The CIM of claim 1 wherein a second instruction of the set of user specified instructions for the group of managed objects is validating a first input to execute the smart contract.

4. The CIM of claim 1 wherein a third instruction of the set of user specified instructions for the group of managed objects is validating a first output to execute the smart contract.

5. The CIM of claim 1 wherein a fourth instruction of the set of user specified instructions is generating a filtered output for the database user.

6. The CIM of claim 1 wherein a fifth instruction of the set of user specified instructions is generating a filtered output for the service operator.

7. A computer program product (CPP) comprising:
a machine readable storage device; and
computer code stored on the machine readable storage device, with the computer code including instructions and data for causing a processor(s) set to perform operations including the following:
providing a hyper-protect secure container, with the hyper-protect secure container including a plurality of access layers, with at least a first access layer being accessible by a database user and a second access layer being accessible by a service operator,
identifying a group of managed objects within the hyper-protect secure container that can be managed by a smart contract,
creating the smart contract, with the smart contract including information indicative of a set of user specified instructions for managing the group of managed objects within the hyper-protect secure container, wherein the smart contract includes additional instructions for various functions comprising performing a backup and restore function on data stored in the hyper-protect secure container and monitoring and alerting the database user with respect to meaningful changes to the data,
receiving an agreement between the database user and the service operator to deploy the smart contract to manage the hyper-protect secure container, and
performing, by the smart contract, the set of user specified instructions for the group of managed objects within the hyper-protect secure container.

8. The CPP of claim 7 wherein a first instruction of the set of user specified instructions for the group of managed objects is validating a first condition to execute the smart contract.

9. The CPP of claim 7 wherein a second instruction of the set of user specified instructions for the group of managed objects is validating a first input to execute the smart contract.

10. The CPP of claim 7 wherein a third instruction of the set of user specified instructions for the group of managed objects is validating a first output to execute the smart contract.

11. The CPP of claim 7 wherein a fourth instruction of the set of user specified instructions is generating a filtered output for the database user.

12. The CPP of claim 7 wherein a fifth instruction of the set of user specified instructions is generating a filtered output for the service operator.

13. A computer system (CS) comprising:
a processor(s) set;
a machine readable storage device; and
computer code stored on the machine readable storage device, with the computer code including instructions and data for causing the processor(s) set to perform operations including the following:
  providing a hyper-protect secure container, with the hyper-protect secure container including a plurality of access layers, with at least a first access layer being accessible by a database user and a second access layer being accessible by a service operator,
  identifying a group of managed objects within the hyper-protect secure container that can be managed by a smart contract,
  creating the smart contract, with the smart contract including information indicative of a set of user specified instructions for managing the group of managed objects within the hyper-protect secure container, wherein the smart contract includes additional instructions for various functions comprising performing a backup and restore function on data stored in the hyper-protect secure container and monitoring and alerting the database user with respect to meaningful changes to the data,
  receiving an agreement between the database user and the service operator to deploy the smart contract to manage the hyper-protect secure container, and
  performing, by the smart contract, the set of user specified instructions for the group of managed objects within the hyper-protect secure container.

14. The CS of claim 13 wherein a first instruction of the set of user specified instructions for the group of managed objects is validating a first condition to execute the smart contract.

15. The CS of claim 13 wherein a second instruction of the set of user specified instructions for the group of managed objects is validating a first input to execute the smart contract.

16. The CS of claim 13 wherein a third instruction of the set of user specified instructions for the group of managed objects is validating a first output to execute the smart contract.

17. The CS of claim 13 wherein a fourth instruction of the set of user specified instructions is generating a filtered output for the database user.

18. The CS of claim 13 wherein a fifth instruction of the set of user specified instructions is generating a filtered output for the service operator.

* * * * *